United States Patent
Maamari

(10) Patent No.: US 10,794,423 B2
(45) Date of Patent: Oct. 6, 2020

(54) AEROSTATIC BEARING

(71) Applicant: ETEL S.A., Motiers (CH)

(72) Inventor: Nadim Maamari, Colombier (CH)

(73) Assignee: ETEL S.A., Motiers (CH)

( * ) Notice: Subject to any disclaimer, the term of this patent is extended or adjusted under 35 U.S.C. 154(b) by 0 days.

(21) Appl. No.: 16/675,234

(22) Filed: Nov. 6, 2019

(65) Prior Publication Data

US 2020/0158171 A1 May 21, 2020

(30) Foreign Application Priority Data

Nov. 15, 2018 (EP) .................................. 18206526

(51) Int. Cl.
*F16C 32/06* (2006.01)
*F16C 29/02* (2006.01)

(52) U.S. Cl.
CPC ................................ *F16C 29/025* (2013.01)

(58) Field of Classification Search
CPC .... F16C 29/025; F16C 32/06; F16C 32/0603; F16C 32/0614; F16C 32/0622; F16C 32/0625; F16C 32/0666; F16C 32/067; F16C 32/0677
See application file for complete search history.

(56) References Cited

U.S. PATENT DOCUMENTS

| 4,045,098 | A | * | 8/1977 | Blondeel | ................ | B65G 51/03 |
| | | | | | | 384/104 |
| 4,073,549 | A | * | 2/1978 | Christ | ................ | F16C 32/0666 |
| | | | | | | 384/122 |
| 4,310,204 | A | * | 1/1982 | Christ | ................ | F16C 32/0666 |
| | | | | | | 384/106 |
| 4,449,834 | A | * | 5/1984 | Franken | .............. | F16C 32/0614 |
| | | | | | | 384/104 |
| 4,560,213 | A | * | 12/1985 | Enderle | ............... | F16C 32/0603 |
| | | | | | | 384/12 |
| 6,276,491 | B1 | * | 8/2001 | Schonfeld | ............. | F16C 29/025 |
| | | | | | | 137/501 |
| 8,333,512 | B2 | * | 12/2012 | Huang | ................ | F16C 32/067 |
| | | | | | | 384/12 |
| 8,803,644 | B2 | | 8/2014 | Dams | | |

FOREIGN PATENT DOCUMENTS

| DE | 2544872 A1 | 4/1976 |
| EP | 0065337 A1 | 11/1982 |
| EP | 0143471 A2 | 6/1985 |
| EP | 2251556 A1 | 11/2010 |
| EP | 3460273 A1 | 3/2019 |
| NL | 1022964 C1 | 9/2004 |

* cited by examiner

*Primary Examiner* — Phillip A Johnson
(74) *Attorney, Agent, or Firm* — Leydig, Voit & Mayer Ltd.

(57) ABSTRACT

An aerostatic bearing includes a slider that is guidable on a guide surface. The slider has an inner, conical sliding surface of an inner air bearing facing the guide surface with a central compressed air supply. The conical sliding surface is attached by first joints to the central compressed air supply and by second joints to a base of the slider arranged on a side of the slider facing away from the guide surface, such that a cone angle of the conical sliding surface is variable. The conical sliding surface is surrounded by an annular sliding surface of an outer air bearing having an annular compressed air supply.

10 Claims, 4 Drawing Sheets

AEROSTATIC BEARING

CROSS-REFERENCE TO PRIOR APPLICATION

Priority is claimed to European Patent Application No. EP 18 206 526.8, filed on Nov. 15, 2018, the entire disclosure of which is hereby incorporated by reference herein.

FIELD

The present invention relates to the field of aerostatic bearings. In particular, the invention relates to an aerostatic bearing which can be adapted to various requirements. For example, it can be designed such that although the weight of a load is held, vibrations of the base underneath are not transmitted to the load.

BACKGROUND

Aerostatic bearings are used in highly accurate positioning devices, in particular in semiconductor manufacturing and testing. The absence of stick slip effects in aerostatic bearings results in a precise and repeatable movement. Aerostatic bearings maintain a clean environment because they do not require oil lubrication and produce no abrasion. They consist of two parts: a guide surface (normally lapped with a low surface roughness) on which a slider (also referred to as a pad) with a compressed air supply slides. One or more openings (inlet limiters) through which the air flows are located on a lower sliding surface of the slider facing the guide surface. Aerostatic bearings are generally classified according to the type of inlet limiter. Those with a centrally fed opening are used particularly frequently because of their simple production. Compressed air is pressed into the slider to operate the bearing. The opening in the sliding surface acts as an inlet limiter; the outlet limiter consists of the thin gap between the guide surface and the underside of the slider. The loading and unloading of the slider change the pressure distribution in the air gap resulting from the change in the gap height and the pressure at the inlet limiter.

Actuating drives are known from U.S. Pat. No. 8,803,644 B2 which make use of the combination of a mechanical spring and a magnetic spring. Here, the force of gravity of a movable structural unit can be compensated by the spring forces, wherein the spring constants of the two springs cancel one another out so that a force-free displacement of the movable structural unit is possible in the working region of the actuating drive. This also prevents the transmission of vibrations between the stationary and the movable structural unit, which is advantageous for exact positioning.

SUMMARY

In an embodiment, the present invention provides an aerostatic bearing which includes a slider that is guidable on a guide surface. The slider has an inner, conical sliding surface of an inner air bearing facing the guide surface with a central compressed air supply. The conical sliding surface is attached by first joints to the central compressed air supply and by second joints to a base of the slider arranged on a side of the slider facing away from the guide surface, such that a cone angle of the conical sliding surface is variable. The conical sliding surface is surrounded by an annular sliding surface of an outer air bearing having an annular compressed air supply.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
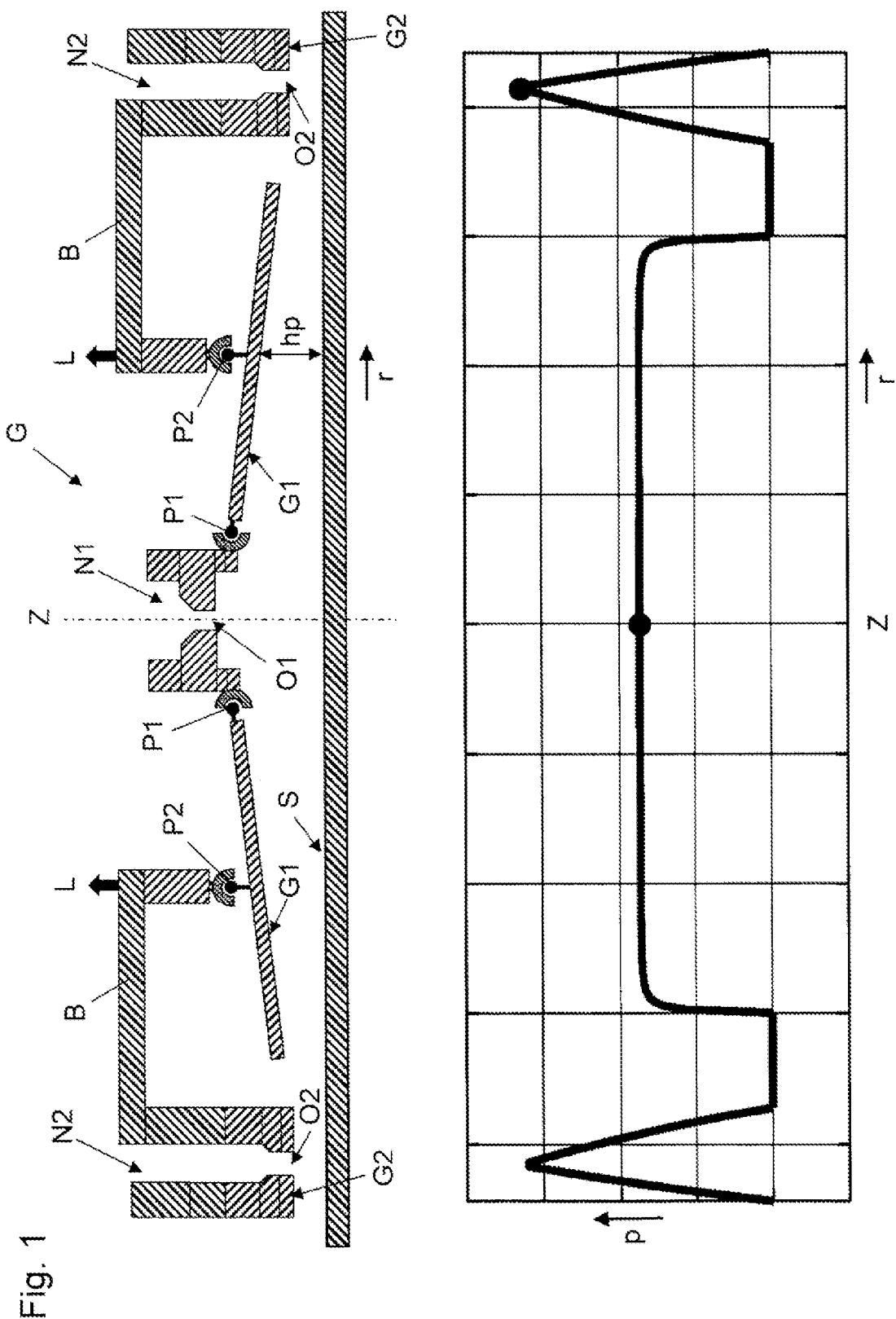
FIG. 1 schematically shows a first embodiment of an aerostatic bearing, along with a representation of the pressure in the air gap of this bearing.

In an embodiment, the invention provides an aerostatic bearing, the area of application of which is expanded in comparison with known aerostatic bearings.

Known aerostatic bearings are not as well-suited for vibration isolation, since, similar to a spring, there is a correlation between the size of the air gap and the load carried by the slider. Vibrations of the base (the guide surface) are therefore also transmitted to the slider or to the load carried by the slider. This makes highly accurate positioning more difficult and makes additional measures for isolating vibrations necessary.

An active aerostatic bearing, comprising a sliding surface with a central air inlet which contains an opening which acts as an inlet limiter for compressed air is described in the application number EP 17192381.6 of the applicant, and can be used as a basis in accordance with an embodiment of the invention. An air gap is formed between a guide surface and a sliding surface. The active aerostatic bearing further comprises a force actuating member that deforms the sliding surface and thus changes the shape of the air gap. The actuating member thereby effects a conical deformation of the sliding surface. The mechanical behavior and the air gap of this active air bearing can thus be set, within wide limits.

According to an embodiment, an aerostatic bearing having a slider which is guided on a guide surface is provided. The bearing has an inner, conical sliding surface of an inner air bearing facing the guide surface and having a central compressed air supply, wherein the conical sliding surface is attached to the central compressed air supply by means of first joints and to a base of the slider arranged on a side of the slider facing away from the guide surface by means of second joints, such that a cone angle of the conical sliding surface is variable. The conical sliding surface is surrounded by an annular sliding surface of an outer air bearing which has an annular compressed air supply.

By combining an inner and an outer air bearing, completely new areas of application of such air bearings can now be achieved. As will be shown further below, the inner air bearing can be designed to have a negative stiffness when considered in isolation. This means that, as the load increases, the air gap of the bearing, contrary to the illustrative expectation, is not reduced; rather, it is increased. This is possible thanks to the articulated attachment of the conical sliding surface and the fact that the cone angle also changes with the load on the bearing. In conjunction with the conical sliding surface, the joints form a torsion spring which is deflected by the pressure prevailing in the air bearing. If the spring constant of this torsion spring is small enough, an additional force on the bearing can deflect the conical sliding surface to such an extent that the air gap increases.

In contrast, the outer annular air bearing has a positive stiffness, such that, in sum, a small or even negligible stiffness is possible for this combination of two air bearings. This means that a load can be held, for example against gravity, by the air bearing, wherein a change in the air gap takes place virtually without force. Vibrations of the base (of the guide surface) are thus not transmitted to the load.

In an expanded exemplary embodiment, an additional actuator, with which the cone angle of the inner air bearing can be influenced, also provides for a mechanical behavior of the aerostatic bearing that can be set within wide limits, wherein any desired value can be set between a virtually infinite stiffness and a negligible stiffness, or it can be switched between these two states. The air bearing then acts as a precision clutch. Active regulation of the air gap can even result in active vibration damping, which can make separate vibration-isolating systems superfluous.

Further advantages and details of the present invention result from the following description of various embodiments by means of the drawings.

FIG. 1 schematically shows a first exemplary embodiment of an aerostatic bearing. A slider G of the aerostatic bearing runs on a guide surface S. This holds a load L. Often, the slider G must carry the weight of the load L, thus ultimately applying a force opposite to the force of gravity of the load L. For this purpose, the slider G has a sliding surface G1 which, in contrast to conventional air bearings, is not aligned in a manner parallel to the guide surface S, but has the shape of a flat cone. This comprises a conical sliding surface G1 in the center Z of which a compressed air supply N1 in the form of a nozzle with an opening O1 is arranged, through which compressed air is forced between the conical sliding surface G1 and the guide surface S.

The conical sliding surface G1 is attached centrally via one or more first joints P1 to the central compressed air supply N1 and via one or more joints P2 to a base B of the air bearing. The base B carries the load L. The second joints P2 are arranged at approximately ⅔ of the radius of the conical sliding surface G1. At this point, the size of the air gap hp is also measured because a change of this air gap hp by a certain amount raises or lowers the base B and thus the load L by exactly this amount. This is not absolutely the case at other points of the conical sliding surface G1 because the cone angle can change due to the first and second joints P1, P2 without the air gap hp thereby necessarily changing as a result. With the cone angle, the angle of the first sliding surface G1 to an axis of symmetry through the center Z of the first sliding surface G1 is designated; this passes through the imaginary tip of the cone and is perpendicular to the guide surface S. A cone angle of 90° would thus result in a sliding surface G1 lying parallel to the guide surface S. In fact, the cone angle is chosen to be slightly less than 90° and is in a range of approximately 88°-90°.

The first and second joints P1, P2 are preferably designed as bending joints, such that the sliding surface G1 acts like a torsion spring.

The guide surface S and the conical sliding surface G1 in conjunction with the compressed air supply N1 form an inner air bearing. This inner air bearing is annularly surrounded by an outer air bearing. For this purpose, an annular sliding surface G2 is arranged around the inner air bearing, in which an annular compressed air supply N2 with openings O2 ensures an additional air cushion between the annular sliding surface G2 and the guide surface S. "Annular" should be understood here to mean that sufficiently large sliding surfaces G2 and a sufficient number of nozzles N2 around the inner air bearing ensure that the load L is mounted symmetrically with respect to the center Z of the slider G. Three nozzles N2 arranged at intervals of 120° in correspondingly dimensioned sliding surfaces G2 may already suffice for this purpose, but an actually annular sliding surface G2 having a plurality of nozzles N2, for example eight nozzles N2, is preferred.

The lower half of FIG. 1 shows how the pressure p in the air gap hp of this aerostatic bearing is set as a function of the radial position r. In the region of the inner air bearing, below the conical sliding surface G1, a radially constant pressure is established due to the flexibility of the conical sliding surface G1 (specifically due to the elasticity of the first and second bending joints P1, P2), which drops sharply only at the outer edge of the conical sliding surface G1. In contrast, a pressure which decreases linearly from the compressed air supply N2 to the edges of the annular sliding surface G2 results in the region of the outer air bearing.

Figure 2:
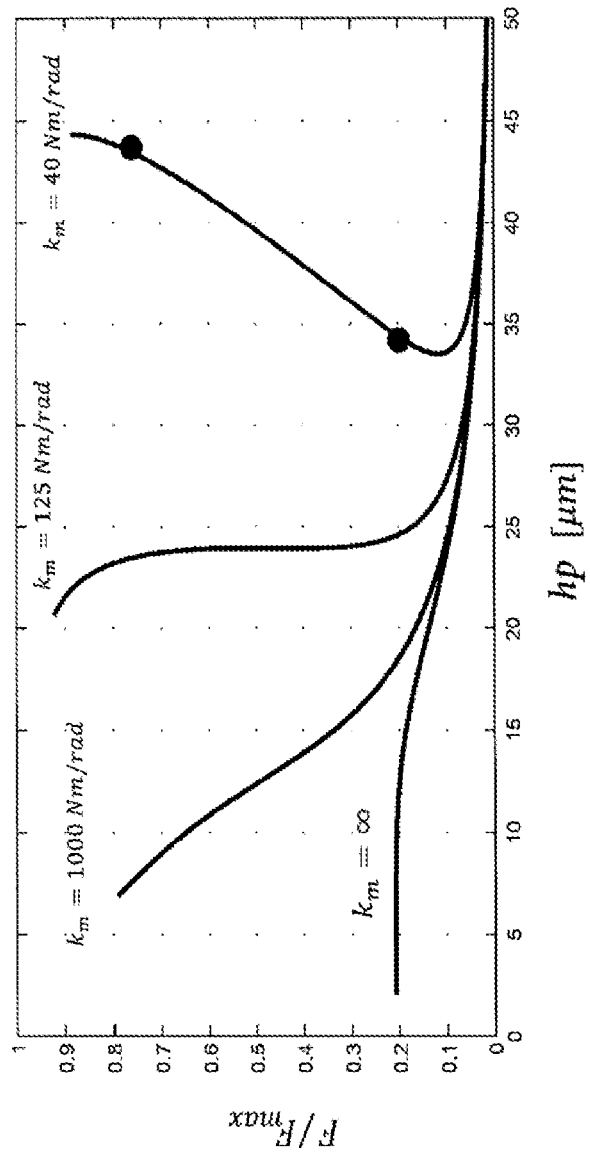
FIG. 2 shows the relationship between the force on the bearing and the air gap for various mechanical designs of the bearing, FIG. 3 gives an explanation for the behavior of the bearing at negative stiffness.

With regard to the inner air bearing, it can now be determined that the conical guide surface G1 in conjunction with the first and second joints P1, P2 effects some interesting properties. FIG. 2 shows a diagram showing the relationship between the force F (relative to a maximum force $F_{max}$) on the bearing and the air gap hp for various mechanical designs of the bearing.

By means of the first and second bending joints P1, P2, the conical sliding surface G1 can be assigned the spring stiffness km of a torsion spring, which indicates the torque necessary in order to change the cone angle by a certain amount. The unit of this spring stiffness km is therefore torque in Newton meters per angular change in radians (Nm/rad). A desired spring stiffness km can be achieved through the design of the bending joints P1, P2.

In the example in FIG. 2, it can be seen that for spring stiffnesses km above 125 Nm/rad, a positive stiffness of the inner air bearing results. The smaller the force on the slider G, the larger the air gap hp is. For a spring stiffness of km=125 Nm/rad, the air gap hp does not change over a wide range of the force; the inner air bearing is infinitely stiff in this range. However, if the bending joints P1, P2 are made particularly soft such that a spring stiffness km of only 40 Nm/rad results, the inner air bearing shows a region with negative stiffness: If the force on the slider G is increased, the air gap hp also becomes larger, and vice versa. The deflection of the torsion spring overcompensates for the change in load.

Figure 3:
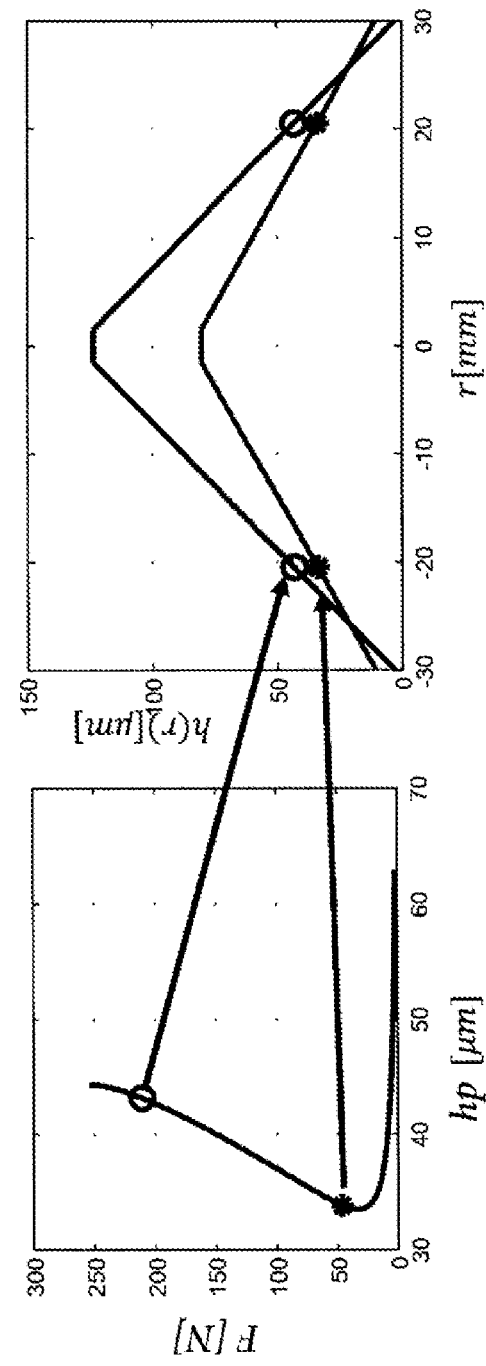

FIG. 3 shows how this initially unexpected behavior occurs. In the left half of FIG. 3, a section of the curve from FIG. 2 designated by km=40 Nm/rad is shown, wherein two points are particularly marked: at one point, the force F on the inner air bearing is 50 N with an air gap hp of 34 μm, and at another point the force is 210 N and the air gap hp is 43 μm. The right half of FIG. 3 shows the curve h(r) of the conical sliding surface G1, which has a radius of 30 mm. The second joints P2 sit at a radius of 20 mm, and there the size of the air gap hp is also determined, as explained above. It can be seen that, in the case of greater force, the larger air gap hp is due to the deformation of the conical sliding surface G1, the cone angle of which changes to smaller values when the load L becomes larger.

Figure 4:
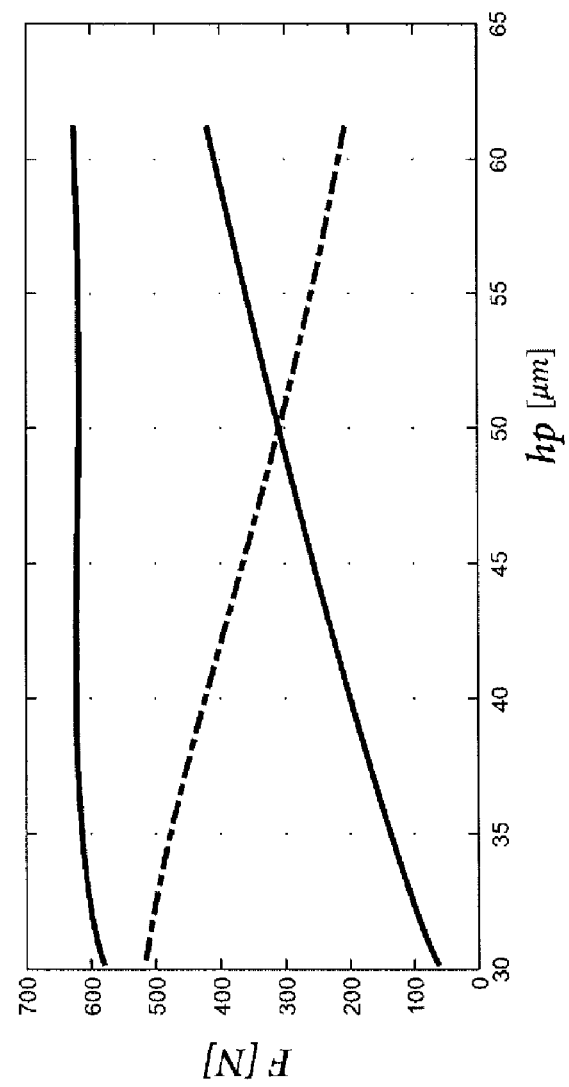
FIG. 4 shows the effect of a combination of two air bearings with stiffnesses of opposite sign.

FIG. 4 shows how a positive stiffness of the annular, outer air bearing (dashed, falling line) and a negative stiffness of the inner air bearing (solid, rising line) can be combined with a suitable design of the two air bearings (thus, equal stiffnesses with opposite signs) to form an air bearing, the air gap hp of which can be changed without changing the force. In other words, the stiffness of the air bearing resulting from the slope of the upper curve is zero or negligibly small. Values of less than 1 N/µm are already useful for vibration isolation, but values of less than 0.1 N/µm to 0 N/µm can also be achieved with a well-tuned system. This means that, although the slider G can carry a certain load (in the example about 600 N, composed of the weight force of the application possibly distributed to a plurality of sliders and a prestress of the air bearing), vibrations of the guide surface S which result in a change in the air gap hp are not transmitted to the load L, and vice versa. A particularly precise positioning of the load L in the plane of the guide surface S is thus made possible.

Such combination of the inner and outer air bearing to form an aerostatic bearing with negligibly small stiffness is only one example of a useful design of this combination. By designing the inner air bearing with other spring stiffnesses km, other applications can also be implemented. However, such an aerostatic bearing is then limited to a specific application.

Figure 5:
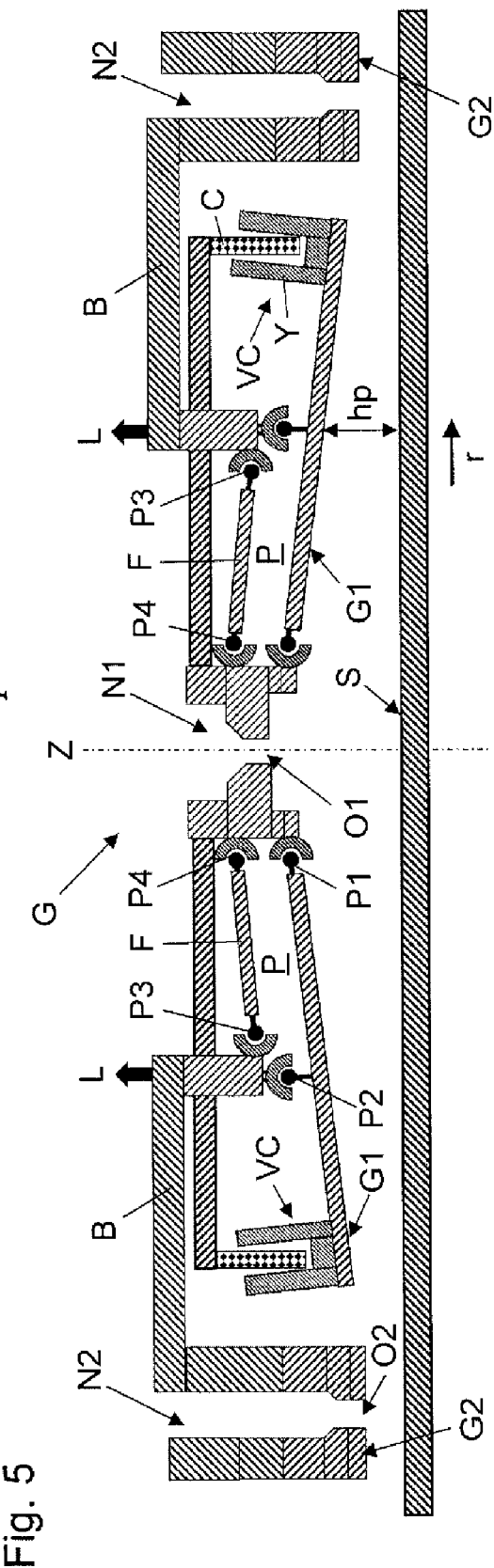
FIG. 5 is a schematic illustration of a second embodiment of the aerostatic bearing expanded by an actuator.

Therefore, in a second exemplary embodiment, an expanded aerostatic bearing is described, which can be adapted to different requirements. FIG. 5 shows once again the aerostatic bearing already known from FIG. 1 with an inner air bearing with a conical sliding surface G1 and an outer annular air bearing with an annular sliding surface G2. The further elements already known from FIG. 1 are not described again here. In addition, an actuator VC is installed in this exemplary embodiment, with which the cone angle of the conical sliding surface G1 can be changed. The actuator VC can be, for example, a voice coil motor. This has a U-shaped yoke Y which is occupied by magnets. An annular coil C is arranged in the yoke Y. If a current passes through this coil C, the Lorentz force of the magnetic field of the magnets on the moving charge carriers in the coil C causes a force which presses the coil C out of the yoke Y or pulls it into the yoke Y, depending on the current direction. Two additional joints P3, P4, which are also designed as bending joints and are arranged on the compressed air supply N1 or on the base B, and an additional connection F between the third and fourth joints P3, P4 form with the conical sliding surface G1 and the first and second joints P1, P2 a parallelogram P, the corner angles of which can be influenced by the actuator VC.

With a servo control for the cone angle measured by means of a strain gauge, the spring stiffness km of the conical sliding surface G1 can be changed within wide limits. If this spring stiffness without the actuator VC or without current in the coil C is km=40 Nm/rad as in the first exemplary embodiment, a spring stiffness of km=125 Nm/rad can also be set by suitable activation of the coil C, such that the inner air bearing has an infinite stiffness (i.e. no change in the air gap hp when the load changes). The stiffness of the entire aerostatic bearing is thus infinite, because an infinite stiffness of the inner air bearing combined with a finite stiffness of the outer air bearing results in an infinite stiffness overall. Thus, the aerostatic bearing of the second exemplary embodiment can be switched between the operating states "negligibly small stiffness" (useful when the load L is at rest or moving at a constant speed and thereby needs to be positioned very accurately) and "infinite stiffness" (useful when the load is to be greatly accelerated for rapid positioning and the exact positioning is not critical), or any states between them can be set.

Figure 6:
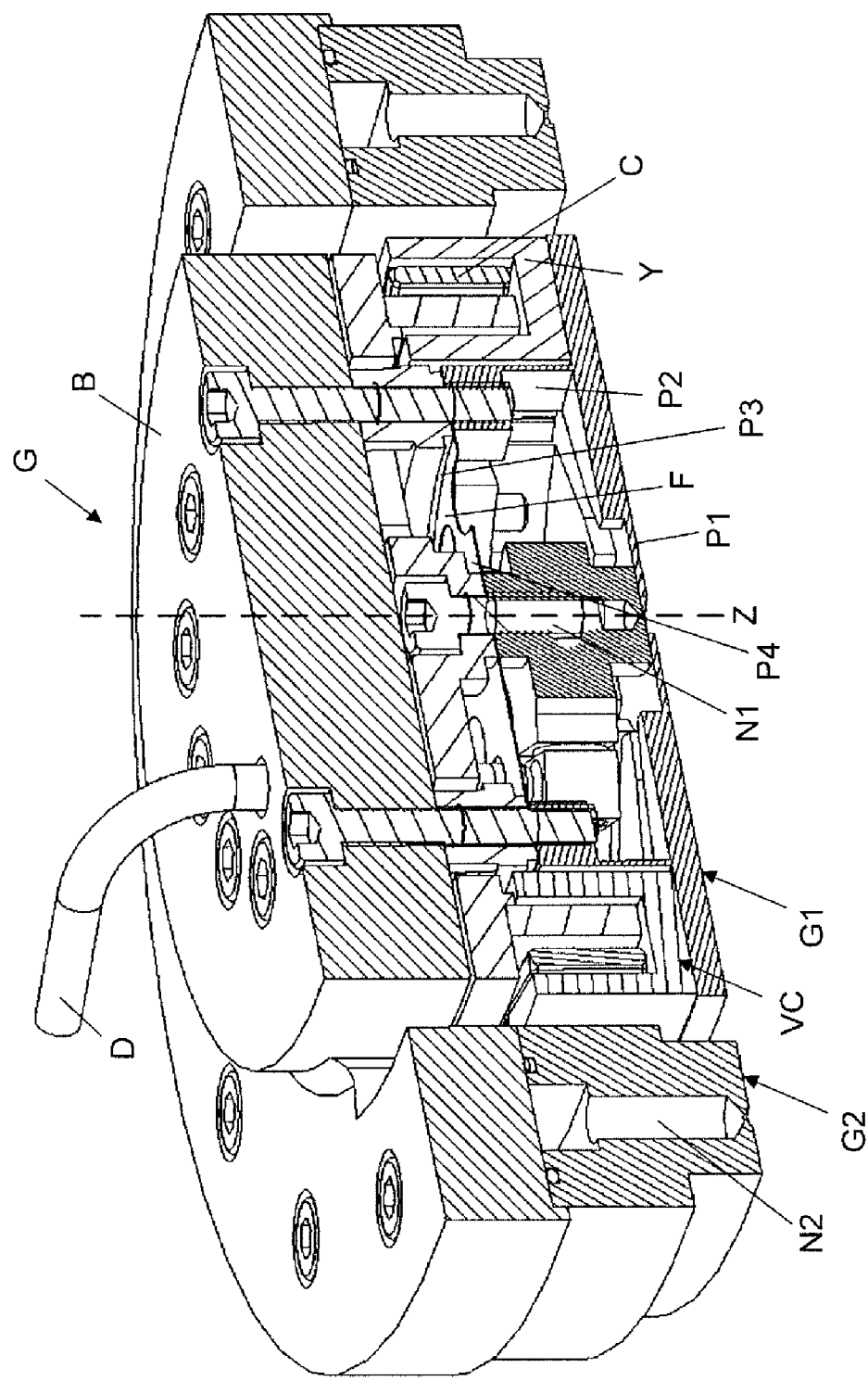
FIG. 6 shows a section through an aerostatic bearing in accordance with the second embodiment.

Finally, FIG. 6 shows a section through a fully designed example of an aerostatic bearing in accordance with the second exemplary embodiment. A compressed air hose D, which is connected to the central compressed air supply N1, and the conical sliding surface G1 of the inner air bearing can be recognized, along with the annular sliding surface G2 with two (of several) annularly arranged nozzles N2. The third and fourth joints P3, P4 or respectively the parallelogram P are realized by an elastic, disk-shaped leaf spring F between the third and fourth joints P3, P4. The weak points which are formed by the first and second bending joints P1, P2 can also be clearly seen. The structure of the inner air bearing thus corresponds to the structure of the air bearing shown in the above-mentioned application EP17192381.6 of the applicant and is described in detail there with reference to FIGS. 5-6.

In summary, the combination of an inner and an outer air bearing creates an aerostatic bearing which can be adapted to various requirements through a suitable design of the inner air bearing. In particular, the combination of two stiffnesses, which are the same amount but with different signs, results in a bearing which can carry a load isolated from vibrations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aerostatic bearing comprising:
a slider that is guidable on a guide surface, the slider having an inner, conical sliding surface of an inner air bearing facing the guide surface with a central compressed air supply,
wherein the conical sliding surface is attached by first joints to the central compressed air supply and by second joints to a base of the slider arranged on a side of the slider facing away from the guide surface, such that a cone angle of the conical sliding surface is variable, and
wherein the conical sliding surface is surrounded by an annular sliding surface of an outer air bearing having an annular compressed air supply.

2. The aerostatic bearing according to claim 1, wherein the inner air bearing has a negative stiffness, and wherein the outer air bearing has a positive stiffness.

3. The aerostatic bearing according to claim 2, wherein the stiffness of the aerostatic bearing as a sum of the negative stiffness and the positive stiffness is less than 1 N/µm.

4. The aerostatic bearing according to claim 2, wherein the stiffness of the aerostatic bearing as a sum of the negative stiffness and the positive stiffness is less than 0.1 N/µm.

5. The aerostatic bearing according to claim 1, wherein the cone angle of the conical sliding surface is adjustable by an actuator.

6. The aerostatic bearing according to claim 5, wherein the actuator acts on a parallelogram which is formed by the first and second joints along with third and fourth joints, wherein the parallelogram is deformable by the actuator, and wherein the conical sliding surface forms one side of the parallelogram and a leaf spring forms a second side of the parallelogram opposite the first side.

7. The aerostatic bearing according to claim 6, wherein each of the first, second, third and fourth joints are bending joints.

8. The aerostatic bearing according to claim 5, wherein the actuator is a voice coil motor.

9. The aerostatic bearing according to claim 8, wherein the voice coil motor has a U-shaped yoke with magnets that is connected to the conical sliding surface and an annular coil that is movably arranged in the U-shaped yoke and is connected to the central compressed air supply.

10. The aerostatic bearing according to claim 1, wherein each of the first and second joints are bending joints.

* * * * *